J. W. WOOD.
SECTIONAL PIPE BALL.
APPLICATION FILED OCT. 18, 1917.
1,288,352.
Patented Dec. 17, 1918.
2 SHEETS—SHEET 1.
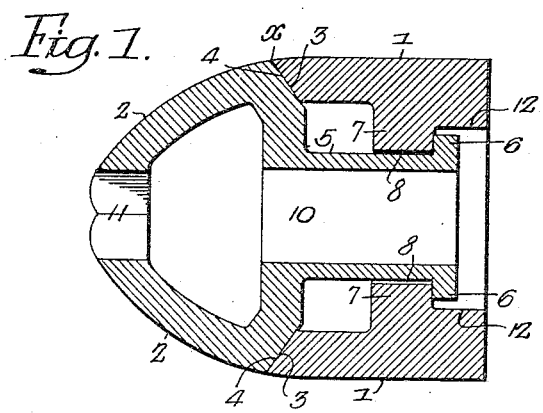
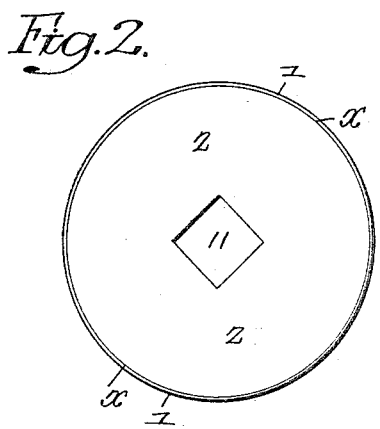
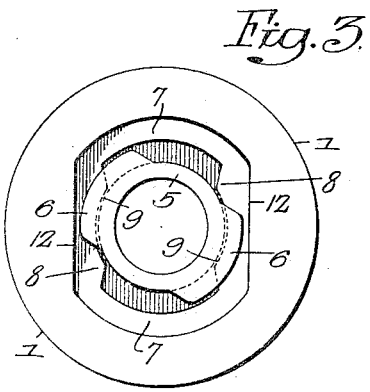
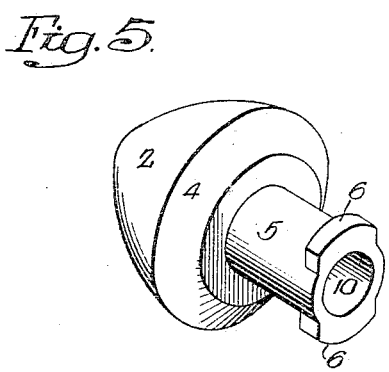
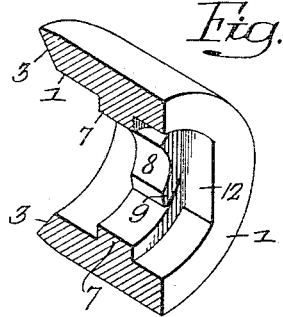
Inventor—
Jacob W. Wood.
by his Attorneys.—
Howson & Howson J. W. WOOD.
SECTIONAL PIPE BALL.
APPLICATION FILED OCT. 18, 1917.
1,288,352.
Patented Dec. 17, 1918.
2 SHEETS—SHEET 2.
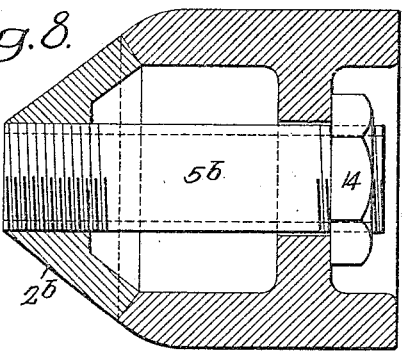
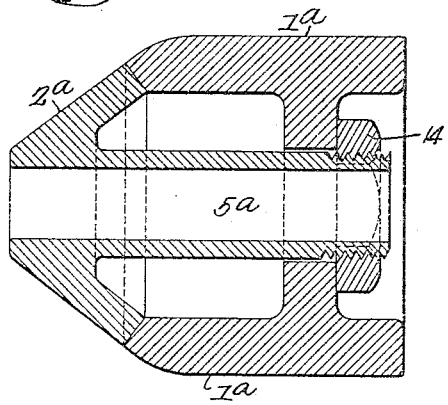
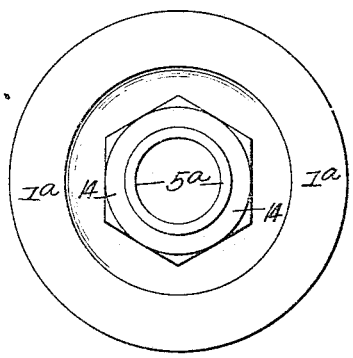
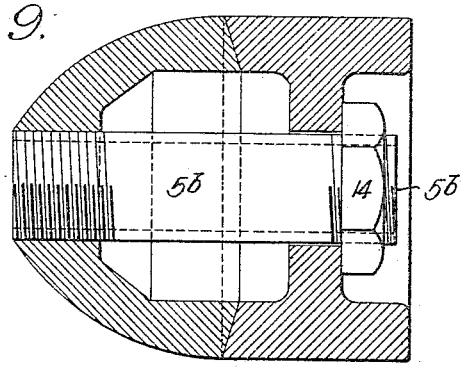
Inventor—
Jacob W. Wood.
by his Attorneys.
Howson & Howson

UNITED STATES PATENT OFFICE.

JACOB W. WOOD, OF ALLENTOWN, PENNSYLVANIA.

SECTIONAL PIPE-BALL.

1,288,352.　　　　　Specification of Letters Patent.　　Patented Dec. 17, 1918.

Application filed October 18, 1917. Serial No. 197,271.

*To all whom it may concern:*

Be it known that I, JACOB W. WOOD, a citizen of the United States, residing in Allentown, Pennsylvania, have invented certain Improvements in Sectional Pipe-Balls, of which the following is a specification.

One object of my invention is to improve the construction of balls used in the manufacture of pipes and other tubing. In the mill in which this ball is used, the ball is held in position between two grooved rolls and the pipe is formed over the ball, the ball acting as a mandrel for the interior of the pipe.

A further object of the invention is to make the locking mechanism integral with the nose section.

In the accompanying drawings:

Figure 1 is a sectional view of my improved pipe ball;

Fig. 2 is an end view;

Fig. 3 is a rear view;

Fig. 4 is a sectional perspective view of the body portion of the ball;

Fig. 5 is a perspective view of the nose;

Fig. 6 is a sectional view illustrating a modification of the means for fastening the nose section to the body portion;

Fig. 7 is a rear view of the ball shown in Fig. 6; and

Figs. 8 and 9 are sectional views illustrating modifications of the invention.

Referring to Fig. 1, 1 is the body portion of the ball. 2 is the nose section which is conical in shape. The joint $x$ between the nose section and the body portion is at a point within the circumference of the body portion, as clearly shown. The front end 3 of the body portion is beveled to correspond with the bevel 4 on the nose section, insuring the proper centering of the body section with respect to the nose. The nose section has an extension 5 on which are lugs 6, the rear portion of each lug being beveled to form a section of a screw. The internal flange 7 of the body portion has an opening through which the extension 5 can project. In this opening are sectional bearings 8 having beveled surfaces 9, which act in conjunction with the beveled surfaces of the lugs 6, so that the lugs 6 can be passed through the opening in the flange and turned to lock the nose and the body portion firmly together. There is an opening 10 in the body portion for the reception of the finger or spindle on which the ball is mounted, and at the outer end of the nose section is a rectangular opening 11, in the present instance, for the reception of a wrench by which the nose can be turned when it is wished to detach the body portion from the nose. In the rear of the body portion is a socket having a flattened surface 12 so that the socket can be placed over a form to hold the body portion from turning when the wrench is applied to the nose section to detach it from the body portion or to attach it thereto.

While I prefer the construction illustrated in Fig. 1, the fastening shown in Figs. 6 and 7 may be used. $5^a$ is an extension of the nose section having a screw thread at its outer end, and 14 is a nut mounted on the threaded portion of the extension so that when the nut is turned the nose section $2^a$ is firmly held to the body portion $1^a$.

In Fig. 8, I have shown the extension $5^b$ made of an independent tube screwed into the nose section $2^b$ and having a nut mounted on the thread at the opposite end of the extension, similar to that shown in Fig. 6.

In Fig. 9, I have illustrated a form of the device, in which the joint between the nose section and the body section is at the greatest diameter of the ball. By having the joint within the greatest diameter of the ball, the surface of the body portion can be turned down, as the body portion becomes worn to accommodate other sizes of pipe and still properly fit against the nose section.

Thus, by the above construction, I provide a ball in which the part subjected to the greatest wear may be removed and another substituted for it without discarding the entire ball, and I also provide a ball in which the two sections can be brought into perfect alinement.

I claim:

1. The combination in a pipe ball, of a nose section having a reduced, hollow extension, said nose section having an annular bearing surface; a body section mounted on the extension of the nose section, the forward end of the body section resting against the annular bearing on the nose section; and means for securing the two sections together.

2. The combination in a pipe ball, of a nose section and a body section, the nose section having a hollow extension and having a tapered periphery, one end of the body section being tapered on a line with the taper of the nose section, the joint between the nose section and the body section being within the greatest diameter of the body section; and means for clamping the two parts together.

3. The combination of a nose section; a hollow extension secured at one end to the nose section, said nose section having a tapered face and having a conical bearing surface at the rear; a body section mounted on the extension and having a conical bearing surface at the forward end to aline with the bearing surface of the end sections; and means for clamping the two parts together.

4. The combination in a pipe ball, of a nose section having an extension and having an annular bearing surface at the rear; a body section having an annular bearing surface at its forward end fitting directly against the bearing of the nose section, said body section being mounted on the extension; and means for holding the body section against the nose section.

5. A body section for a pipe ball, being in the form of a cylinder and having a conical seat at one end and having an internal flange.

6. The combination in a pipe ball, of a body section and a nose section, said nose section having an integral extension; lugs on the rear of the extension, the body portion having an internal flange wider at one part than at another part, so that the extension of the lugs can be passed through the flange and turned so as to lock the body portion to the nose section.

7. The combination in a pipe ball, of a body section and a nose section, said nose section having an integral, hollow extension with integral lugs at the end, the bearing surface of the lugs being beveled; the body portion having an internal flange with beveled bearing surface, so that when the extension of the nose is passed through the flange and turned the two parts will be locked together and drawn tightly against each other, the nose section having an opening in the end to fit a wrench, and the body portion being shaped to fit a fixed projection so that the body portion can be held while the nose is turned.

JACOB W. WOOD.

Copies of this patent may be obtained for five cents each, by addressing the "Commissioner of Patents, Washington, D. C."